US009495122B2

(12) United States Patent
Nakagoshi et al.

(10) Patent No.: US 9,495,122 B2
(45) Date of Patent: Nov. 15, 2016

(54) INFORMATION PROCESSING APPARATUS CAPABLE OF CREATING COMMUNICATION APPLICATION, COMPUTER-READABLE NON-TRANSITORY RECORDING MEDIUM WITH APPLICATION CREATING PROGRAM FOR CREATING COMMUNICATION APPLICATION STORED THEREON, AND PROGRAMMING TOOL

(71) Applicant: KYOCERA Document Solutions Inc., Osaka (JP)

(72) Inventors: Yumi Nakagoshi, Osaka (JP); Sachiko Yoshimura, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 14/839,141

(22) Filed: Aug. 28, 2015

(65) Prior Publication Data
US 2016/0070515 A1 Mar. 10, 2016

(30) Foreign Application Priority Data

Sep. 8, 2014 (JP) .................................. 2014-182662

(51) Int. Cl.
*G06F 3/12* (2006.01)
*H04N 1/32* (2006.01)
(Continued)

(52) U.S. Cl.
CPC ........... *G06F 3/1243* (2013.01); *G06F 3/1205* (2013.01); *G06F 3/125* (2013.01); *G06F 3/1206* (2013.01);
(Continued)

(58) Field of Classification Search
None
See application file for complete search history.

(56) References Cited

U.S. PATENT DOCUMENTS 8,570,571 B2* 10/2013 Moroi ................ H04N 1/00244
358/1.15
2011/0164283 A1* 7/2011 Sadasue ................ G06F 3/1204
358/1.16
(Continued)

FOREIGN PATENT DOCUMENTS

JP 2004303124 A 10/2004
JP 2007089181 A 4/2007
(Continued)

*Primary Examiner* — Dov Popovici
(74) *Attorney, Agent, or Firm* — IP Business Solutions, LLC

(57) ABSTRACT

An information processing apparatus includes a tool storage section, an acquisition method acceptance section, a template specification acceptance section, and an application creating section. The tool storage section stores a programming tool having a function of acquiring print data from an advertisement delivery server and a function of managing the print data. The acquisition method acceptance section is configured to accept setting of a data acquisition method for acquiring the print data. The template specification acceptance section is configured to accept specification of a template for use in printing the print data. The application creating section is configured to use the programming tool to create a communication application allowing acquisition of the print data according to the accepted data acquisition method and generation of an image according to the accepted template.

6 Claims, 12 Drawing Sheets

(51) Int. Cl.
  *H04N 1/387*  (2006.01)
  *H04N 1/40*  (2006.01)

(52) U.S. Cl.
  CPC ........ *G06F 3/1287* (2013.01); *H04N 1/32021* (2013.01); *H04N 1/32133* (2013.01); *H04N 1/387* (2013.01); *H04N 1/40062* (2013.01); *H04N 1/40068* (2013.01); *H04N 2201/0082* (2013.01)

(56) References Cited

U.S. PATENT DOCUMENTS

| | | |
|---|---|---|
| 2012/0133985 A1 | 5/2012 | Kida et al. |
| 2014/0146333 A1* | 5/2014 | Shiohara ............... G06F 3/1208 358/1.13 |
| 2016/0065756 A1* | 3/2016 | Araki ....................... B41J 29/00 358/1.15 |

FOREIGN PATENT DOCUMENTS

| | | |
|---|---|---|
| JP | 2012-118722 A | 6/2012 |
| JP | 2012-238203 A | 12/2012 |

\* cited by examiner

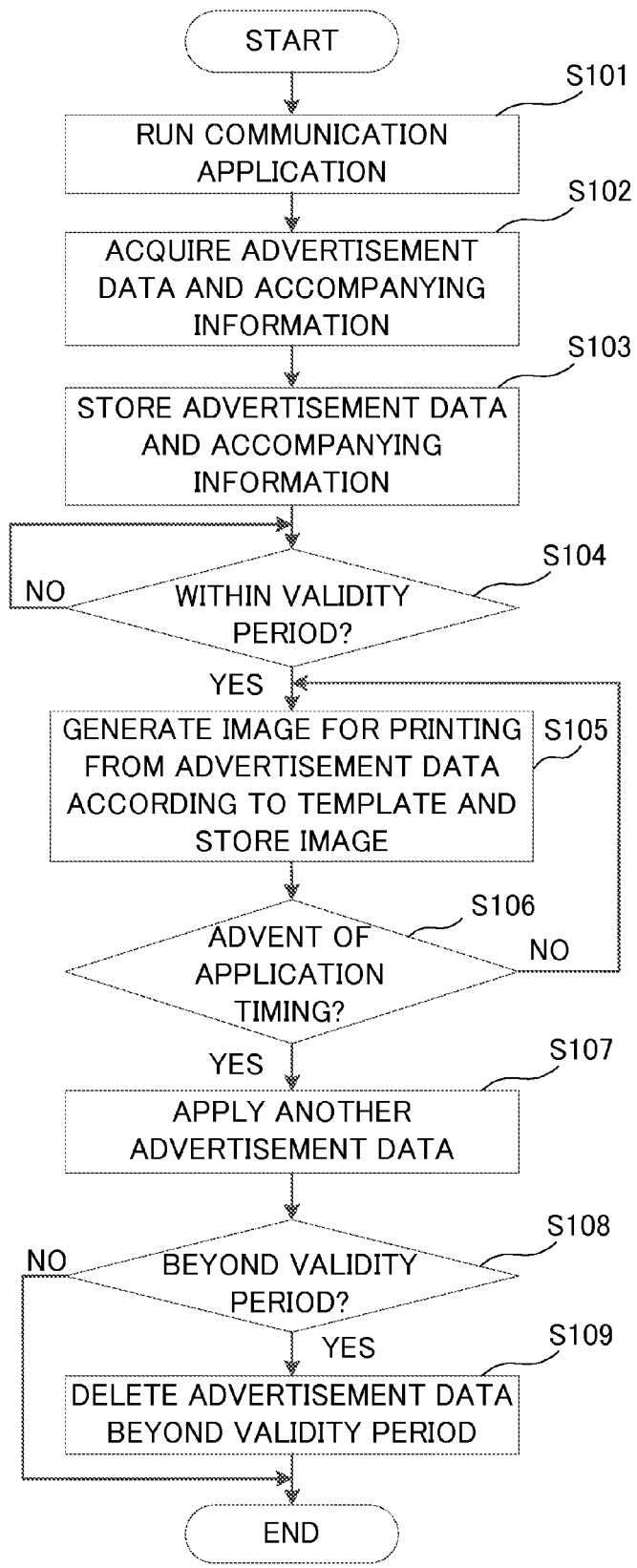

INFORMATION PROCESSING APPARATUS CAPABLE OF CREATING COMMUNICATION APPLICATION, COMPUTER-READABLE NON-TRANSITORY RECORDING MEDIUM WITH APPLICATION CREATING PROGRAM FOR CREATING COMMUNICATION APPLICATION STORED THEREON, AND PROGRAMMING TOOL

INCORPORATION BY REFERENCE

This application claims priority to Japanese Patent Application No. 2014-182662 filed on Sep. 8, 2014, the entire contents of which are incorporated by reference herein.

BACKGROUND

The present disclosure relates to an information processing apparatus capable of creating a communication application, a computer-readable non-transitory recording medium with an application creating program for creating a communication application stored thereon, and a programming tool.

Currently, various techniques are being proposed in which image forming apparatuses placed in public facilities or the like previously receive print data from a print data providing device, such as a server on a network, and, upon users' operation of copying or the like on the image forming apparatuses, print an advertisement image indicated by the print data on printed materials, for example, on the back sides thereof. For example, a system is being proposed in which a multifunction peripheral receives advertisement data in PDL format from an advertisement delivery server, converts the advertisement data into bitmap format, and then prints a bitmap advertisement image on the back side of a printed material.

Meanwhile, in order to add functions to information processing apparatuses and client terminals, various applications installable on such equipment have been developed. A technique is also being proposed for facilitating the development of new applications. Furthermore, SDKs (software development kits) are being provided to application developers. The developers create new applications by adding a new function using such a provided SDK.

SUMMARY

A technique improved over the aforementioned techniques is proposed as one aspect of the present disclosure.

An information processing apparatus according to an aspect of the present disclosure is configured to create a communication application capable of allowing a client terminal to acquire print data from a print data providing device and allowing the client terminal to manage the acquired print data.

The information processing apparatus includes a tool storage section, an acquisition method acceptance section, a template specification acceptance section, and an application creating section.

The tool storage section stores a predetermined programming tool having a function of communication with the print data providing device, and a function of management of the print data acquired from the print data providing device.

The acquisition method acceptance section is configured to accept setting of a data acquisition method for acquiring the print data from the print data providing device.

The template specification acceptance section holds a plurality of templates indicating different layouts for the print data and is configured to accept specification of a template for use in printing the print data from among the plurality of templates.

The application creating section is configured to use the programming tool stored in the tool storage section to create the communication application allowing acquisition of the print data from the print data providing device according to the accepted data acquisition method and generation of an image using the print data according to the template accepted by the template specification acceptance section.

A computer-readable non-transitory recording medium according to another aspect of the present disclosure stores an application creating program capable of creating a communication application.

The application creating program is configured to create the communication application capable of allowing a client terminal to acquire print data from a print data providing device and allowing the client terminal to manage the acquired print data.

The application creating program is further configured to allow a computer to operate as the tool storage section, the acquisition method acceptance section, the template specification acceptance section, and the application creating section.

BRIEF DESCRIPTION OF THE DRAWINGS

FIG. 12 is a flowchart showing processing for data communication and data management performed by the image forming apparatus based on the communication application.

DETAILED DESCRIPTION

Hereinafter, a description will be given of an application creating program, a computer-readable non-transitory recording medium with the application creating program stored thereon, an information processing apparatus, and a programming tool, all according to one embodiment as one aspect of the present disclosure, with reference to the drawings.

Figure 1:
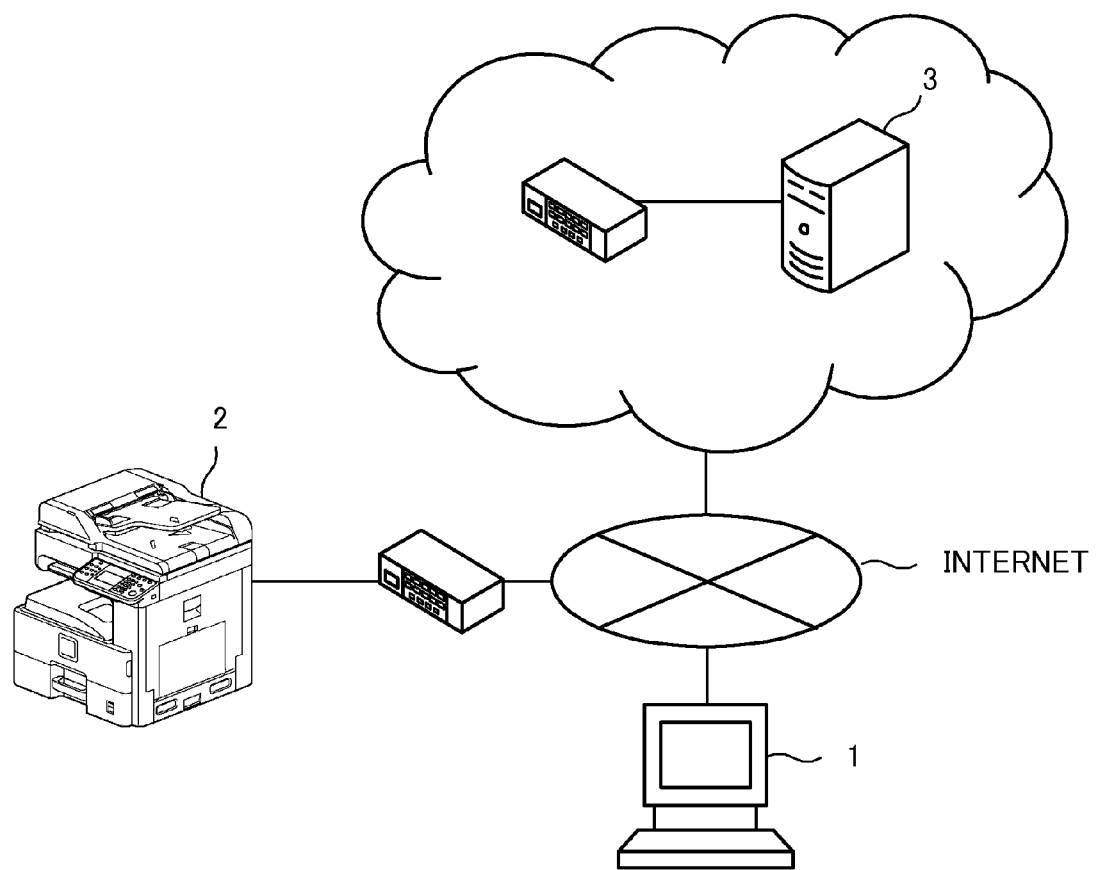
FIG. 1 is a conceptual diagram showing how an information processing apparatus and an image forming apparatus are connected via the Internet to an advertisement delivery server on the Web.

FIG. 1 is a conceptual diagram showing how an information processing apparatus and an image forming apparatus are connected via the Internet to an advertisement delivery server on the Web.

An information processing apparatus 1, an image forming apparatus 2, and an advertisement delivery server 3 are connected via the Internet.

The information processing apparatus 1 is configured to create a communication application according to an application creating program (to be described hereinafter in detail) installed thereon. This communication application allows data communication to be performed between the image forming apparatus 2 and the advertisement delivery server 3 and allows the image forming apparatus 2 to manage advertisement data (i.e., print data of an advertisement image indicating the contents of an advertisement) received from the advertisement delivery server 3.

The image forming apparatus (an example of a client terminal in Claims) 2, when the communication application is installed thereon, connects to the advertisement delivery server 3 according to this communication application, receives advertisement data from the advertisement delivery server 3, and manages the received advertisement data.

The advertisement delivery server (an example of a print data providing device in Claims) 3 is a server for providing an advertisement data delivery service on the Web. The advertisement delivery server 3 holds, on an internal HDD or the like, advertisement data formed of an advertisement image indicating the contents of an advertisement. The advertisement delivery server 3 is configured to send the advertisement data via the Internet in response to a request from the image forming apparatus 2 or by itself to the image forming apparatus 2 at predetermined time intervals.

Figure 2:
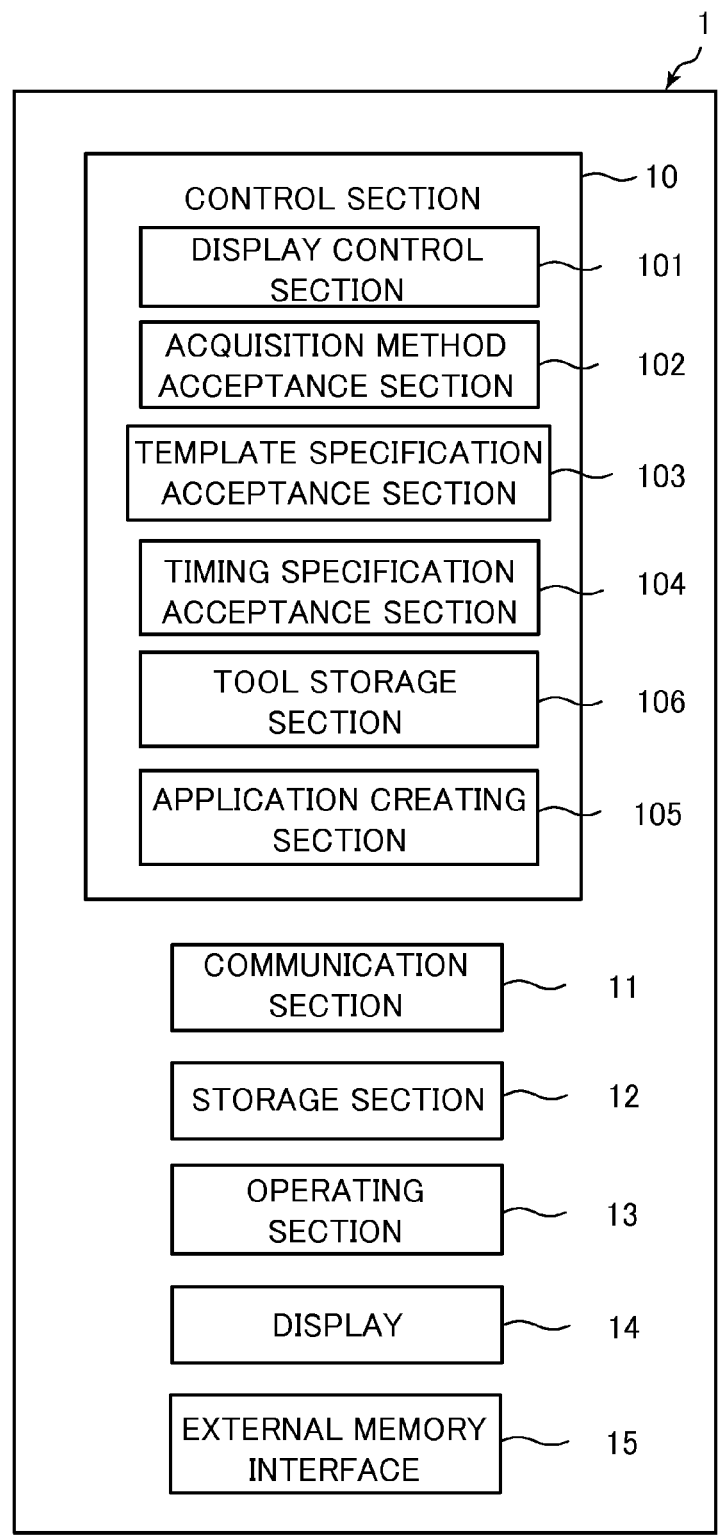
FIG. 2 is a block diagram showing an electrical configuration of the information processing apparatus.
Figure 3:
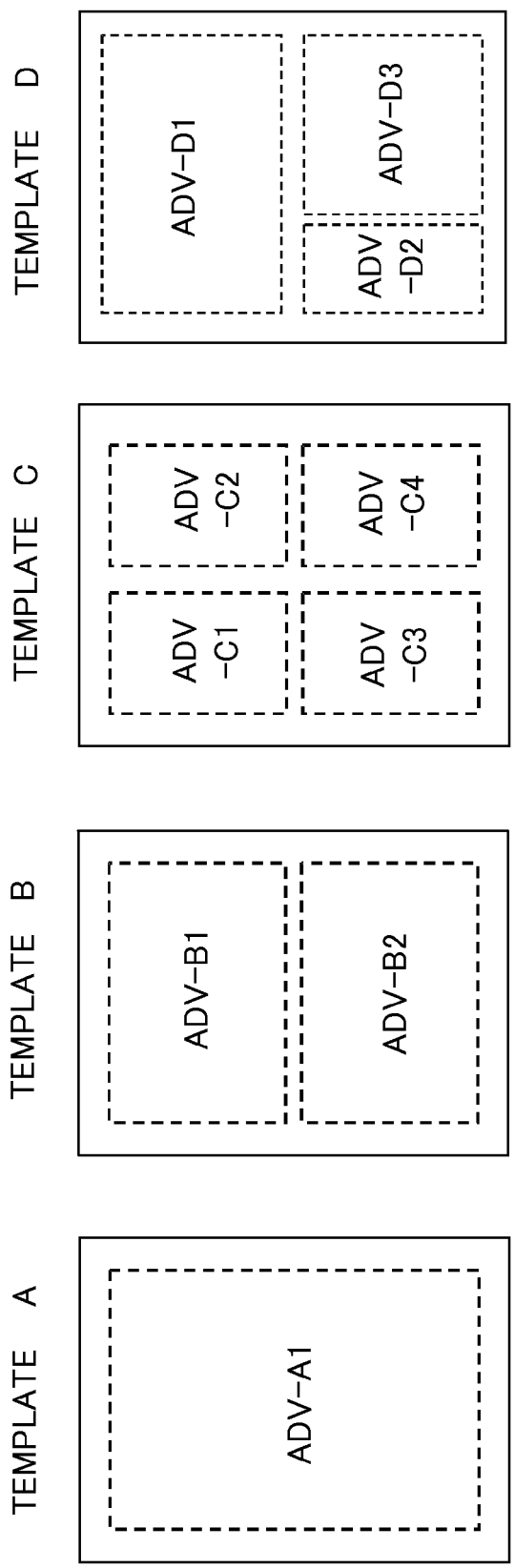
FIG. 3 is a diagram illustrating examples of templates.

Next, a description will be given of an electrical configuration of the information processing apparatus 1. FIG. 2 is a block diagram showing the electrical configuration of the information processing apparatus 1. FIG. 3 is a diagram illustrating examples of templates. The information processing apparatus 1 includes a control section 10, a communication section 11, a storage section 12, an operating section 13, a display 14, and an external memory interface 15.

The communication section 11 is an interface for performing processing for communication with the image forming apparatus 2 and so on via the Internet.

The storage section 12 is formed of an HDD (hard disk drive) or the like, on which an application creating program according to the one embodiment can be installed.

The operating section 13 is formed of, for example, a mouse pointer and a keyboard, and configured to accept entry of various operating instructions from an operator.

The display 14 is formed of an LCD (liquid crystal display) or the like and configured to display various images under the control of a display control section 101.

The external memory interface 15 can be connected to an external memory (an example of a print data providing device in Claims), such as a USB memory, so that the external memory can read data through the external memory interface 15 from the information processing apparatus 1.

The control section 10 is composed of a CPU (central processing unit), a RAM, a ROM, a dedicated hardware circuit, and so on and governs the overall operation of the information processing apparatus 1. The control section 10 includes a display control section 101, a tool storage section 106, an acquisition method acceptance section 102, a template specification acceptance section 103, a timing specification acceptance section 104, and an application creating section 105. The storage section 12 holds the application creating program according to the one embodiment of the present disclosure. The control section 10 operates according to the application creating program to function as the display control section 101, the tool storage section 106, the acquisition method acceptance section 102, the template specification acceptance section 103, the timing specification acceptance section 104, and the application creating section 105, which perform necessary processing steps for creating an application described below in this embodiment. The control section 10 may not operate according to the application creating program, but alternatively may include as hardware circuits the display control section 101, the tool storage section 106, the acquisition method acceptance section 102, the template specification acceptance section 103, the timing specification acceptance section 104, and the application creating section 105.

The display control section 101 is configured to control a display operation of the display 14. For example, during processing for creating a communication application based on the application creating program, the display control section 101 allows the display 14 to display, as a user interface, various operating screens to be described hereinafter.

The acquisition method acceptance section 102 is configured to accept setting of a data acquisition method in receiving advertisement data from the advertisement delivery server 3 and an external memory device. The image forming apparatus 2 connects to the advertisement delivery server 3 according to the communication application and receives advertisement data from the advertisement delivery server 3 by the specified advertisement data acquisition method.

For example, the acquisition method acceptance section 102 accepts operator's specification of either one of the following advertisement data acquisition methods: (A) a method in which the image forming apparatus 2 receives advertisement data sent from the advertisement delivery server 3 at predetermined times or advertisement data read from an external memory such as a USB memory; and (B) a method in which the image forming apparatus 2 accesses the advertisement delivery server 3 at predetermined times to acquire advertisement data from the advertisement delivery server 3.

As for the method (A), the acquisition method acceptance section 102 further accepts operator's specification of one of (1) an HTTP or HTTPS POST request, (2) a SOAP request, and (3) readout from a USB memory.

In specifying (1) an HTTP or HTTPS POST request described above (for example, sending of multipart/form-data), the operator enters, for example, the following items through the operating section 13. The entered items are accepted by the acquisition method acceptance section 102.

(11) the path of a URL (for example, *** of the following URL http://000.000.0.1/***);

(12) the property name of an advertisement ID (such as image-id);

(13) the property name of a validity period (such as begin-date and end-date);

(14) the format of date and time (such as yyyy/MM/dd HH:mm:ss); and

(15) the property name of an advertisement template (such as ad-template).

In this case, the advertisement delivery server 3 sends to the image forming apparatus 2, in addition to the advertisement data, pieces of accompanying information including the advertisement ID and the validity period, which are formed of a property name or a format as described above, in the form of multipart/form data of HTTP or HTTPS. When receiving the advertisement data and the above pieces of accompanying information, the image forming apparatus 2 stores the received advertisement data and pieces of accompanying information on the internal HDD 92.

In specifying (2) a SOAP request described above, the operator enters, for example, the following items through the operating section 13. The entered items are accepted by the acquisition method acceptance section 102.

(21) the path of a URL (for example, *** of the following URL http://000.000.0.1/***);

(22) namespace;

(23) the property name indicating one advertisement (such as ad-image);

(24) the property name of advertisement data (such as data);

(25) the property parameter name of an advertisement ID (such as image-id);

(26) the property parameter name of a validity period (such as begin-date and end-date);

(27) the format of date and time (such as yyyy/MM/dd HH:mm:ss); and

(28) the property name of an advertisement template (such as ad-template).

In the SOAP communication, the advertisement delivery server 3 sends advertisement data and pieces of accompanying information including an advertisement ID and a validity period to the image forming apparatus 2. When receiving the advertisement data and the above pieces of accompanying information, the image forming apparatus 2 stores the received advertisement data and pieces of accompanying information on the internal HDD 92.

At this time, the image forming apparatus 2 receives data in XML format, for example, data as shown below:

```
<ad-image>
<data>(advertisement data)</data>
<image-id>0001</image-id>
<begin-date>2013/11/20 0:0:0</begin-date>
<end-date>2013/11/30 23:59:59</end-date>
<ad-template>A</ad-template>
<option>advertisement about AAA</option>
</ad-image>
```

In specifying (3) readout from a USB memory described above, there is no particular item to be set by the operator. In this case, when advertisement data is stored in the USB memory, the advertisement ID is also stored as a file name thereof. When the USB memory containing the advertisement data stored therein is connected to a network interface section 91 of the image forming apparatus 2, a data acquisition section (to be described hereinafter) of the image forming apparatus 2 reads out the advertisement data in the USB memory and stores the read advertisement data on the HDD 92.

On the other hand, in the method (B), the operator enters, for example, the items listed below through the operating section 13. The entered items are accepted by the acquisition method acceptance section 102. The image forming apparatus 2 accesses the advertisement delivery server 3 at predetermined times to acquire advertisement data via a HTTP or HTTPS POST request from the advertisement delivery server 3.

(31) a URL for acquiring a file list and a request type (such as GET), wherein the URL can be stored as divided into an address and a path, because it is possible that the operator (developer) specifies the path only and then the operator enters the address of the advertisement delivery server 3 in installing a system (at the start of data communication and management operations as a result of the installation of the communication application on the image forming apparatus 2, the same applies hereinafter);

(32) the format of a response;

(33) the property name of a response containing file list information;

(34) the property name of a file ID;

(35) the property name for identifying a file format;

(36) a URL for acquiring file information and a request type (such as GET), wherein the URL can be stored as divided into an address and a path, because it is possible that the operator specifies the path only and then enters the address of the advertisement delivery server 3 in installing a system;

(37) the attribute of a download URL; and

(38) date and time to acquire advertisement data (such as daily at midnight).

The image forming apparatus 2 accesses, at every specified date and time to acquire advertisement data, the advertisement delivery server 3 indicated by the URL for acquiring a file list, acquires advertisement data from the advertisement delivery server 3, and stores the acquired advertisement data on the internal HDD 92.

If a validity period is specified, a data management section (to be described hereinafter) of the image forming apparatus 2 containing the communication application installed thereon allows the HDD 92 to store, in addition to the advertisement data already stored on the HDD 92, the just-acquired advertisement data. On the other hand, if no validity period is specified, the data management section of the image forming apparatus 2 deletes all the advertisement data already stored on the HDD 92 and replaces it with the just-acquired advertisement data.

The template specification acceptance section 103 holds a plurality of templates indicating different layouts for print images indicated by advertisement data and is configured to accept specification of a template for use in printing one or more print images from among the plurality of templates based on operator's operation of the operating section 13. For example, the template specification acceptance section 103 holds a plurality of predetermined templates A, B, C, and D as shown in FIG. 3 and accepts the specification of any one of these templates based on operator's (developer's) operation of the operating section 13.

The template specification acceptance section 103 can create a new template using a property name as a template name, a location of an image, and an image size, which have been specified by operator's operation of the operating section 13, and hold it as a predetermined template described above.

The timing specification acceptance section 104 is configured to, when any image for printing is generated and held by the data management section 203 described below, accept from the operator the timing to generate a new image for printing using different advertisement data already held and the specified template.

The tool storage section 106 holds a predetermined programming tool having the function of communication with the advertisement delivery server 3 and the function of management of the received advertisement data.

This programming tool is incorporated into a communication application to be created and functions as part of the communication application. The programming tool contains a program for allowing the image forming apparatus 2 to connect via a network to the advertisement delivery server 3 and perform data communication with the advertisement delivery server 3. The programming tool has the function of allowing the image forming apparatus 2, which is a client terminal, to operate as a data communication section and a data management section. The data communication section is configured to allow the image forming apparatus 2 to perform data communication with the advertisement delivery server 3. The data management section is configured to manage advertisement data acquired by data communication of the data communication section.

The application creating section 105 is configured to create a communication application by setting, to the programming tool stored in the tool storage section 106, a data acquisition method accepted by the acquisition method acceptance section 102, a template, accepted by the template specification acceptance section 103, for use in the above image generation, and an applicable timing accepted by the timing specification acceptance section 104. In other words, the application creating program creates a communication application using the programming tool as an SDK.

The communication application created by the application creating section 105 is sent from the communication section 11 via the Internet to the image forming apparatus 2 or stored through the external memory interface 15 into a USB memory and transferred through the USB memory to the image forming apparatus 2.

Figure 4:
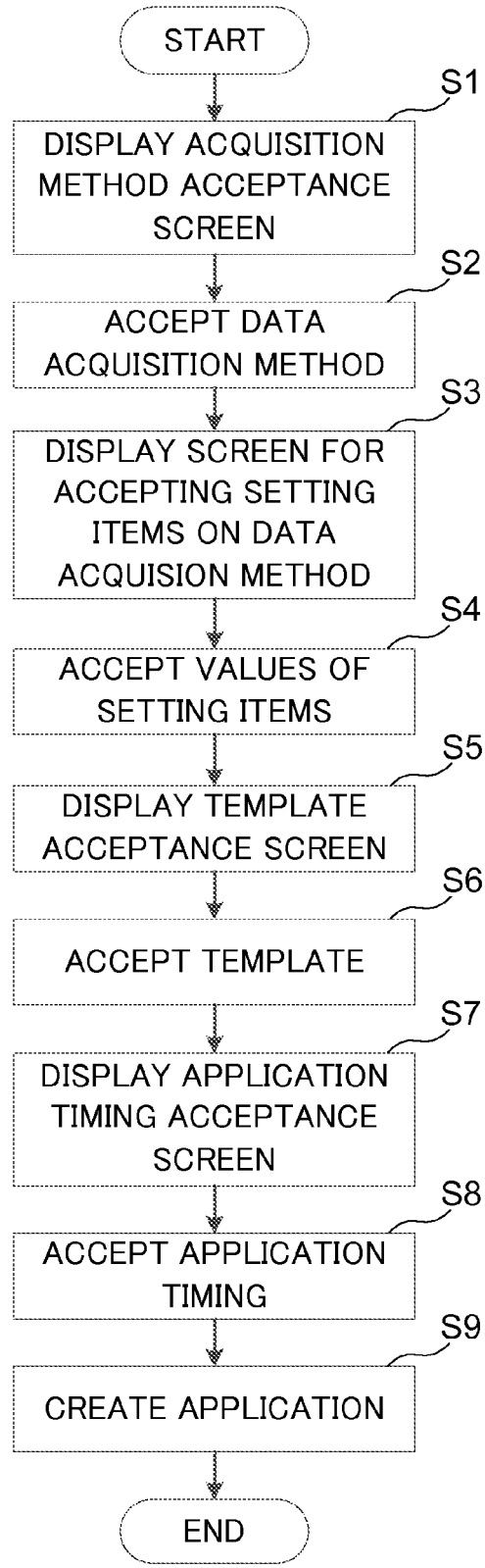
FIG. 4 is a flowchart showing processing for creating a communication application by the information processing apparatus.
Figure 5:
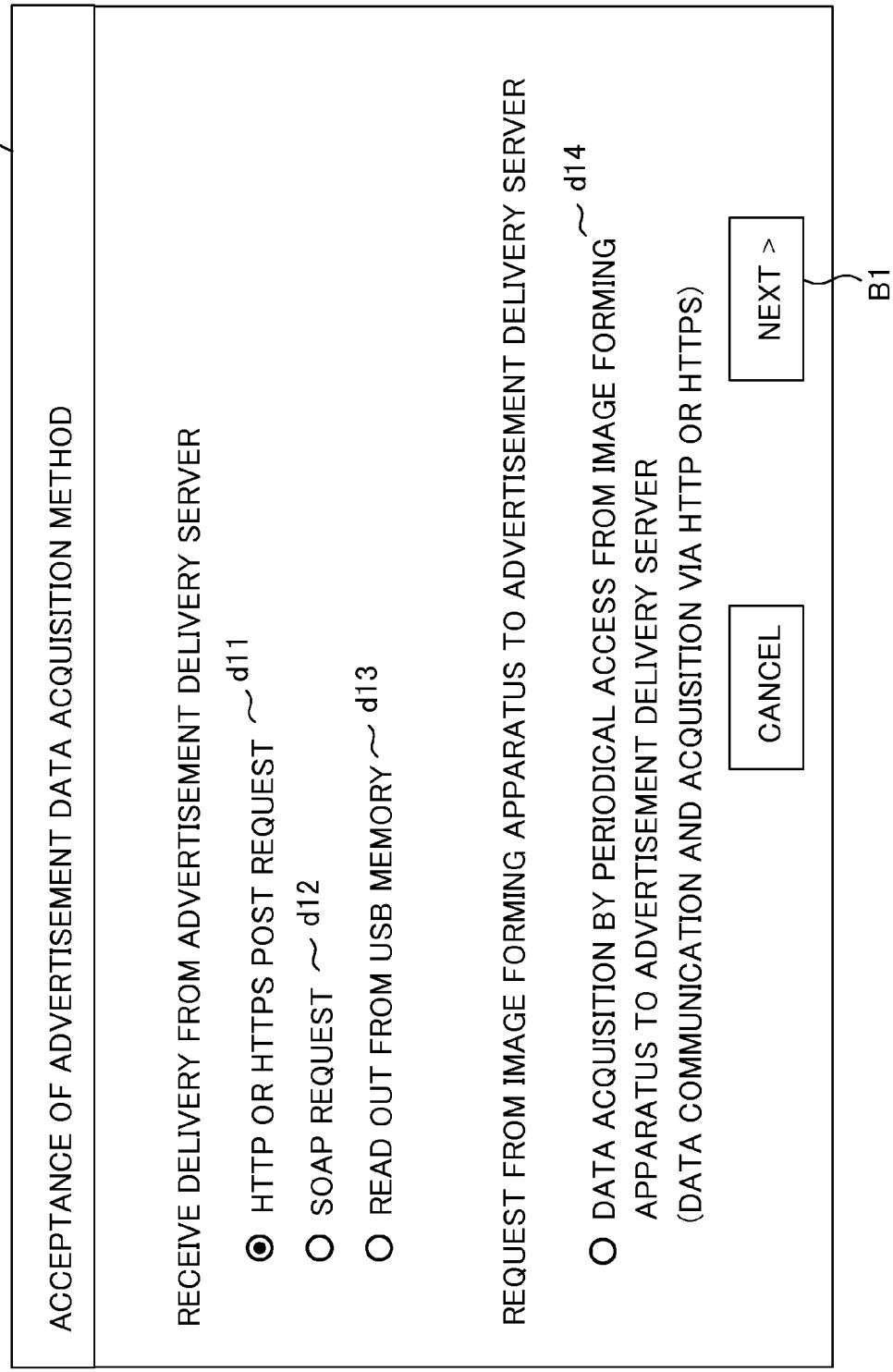
FIG. 5 shows an example of a screen displayed on a display.
Figure 6:
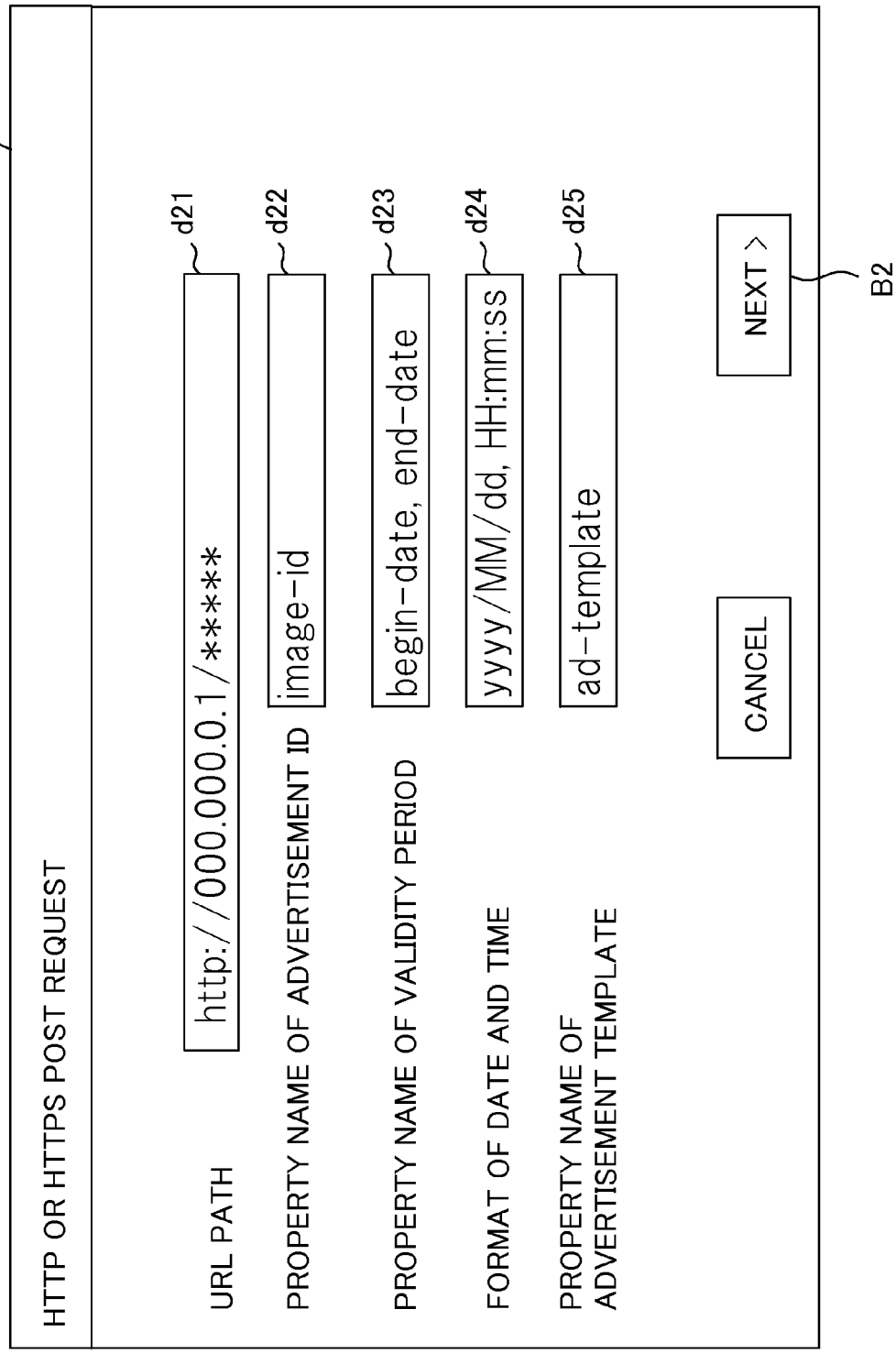
FIG. 6 shows an example of another screen displayed on the display.
Figure 7:
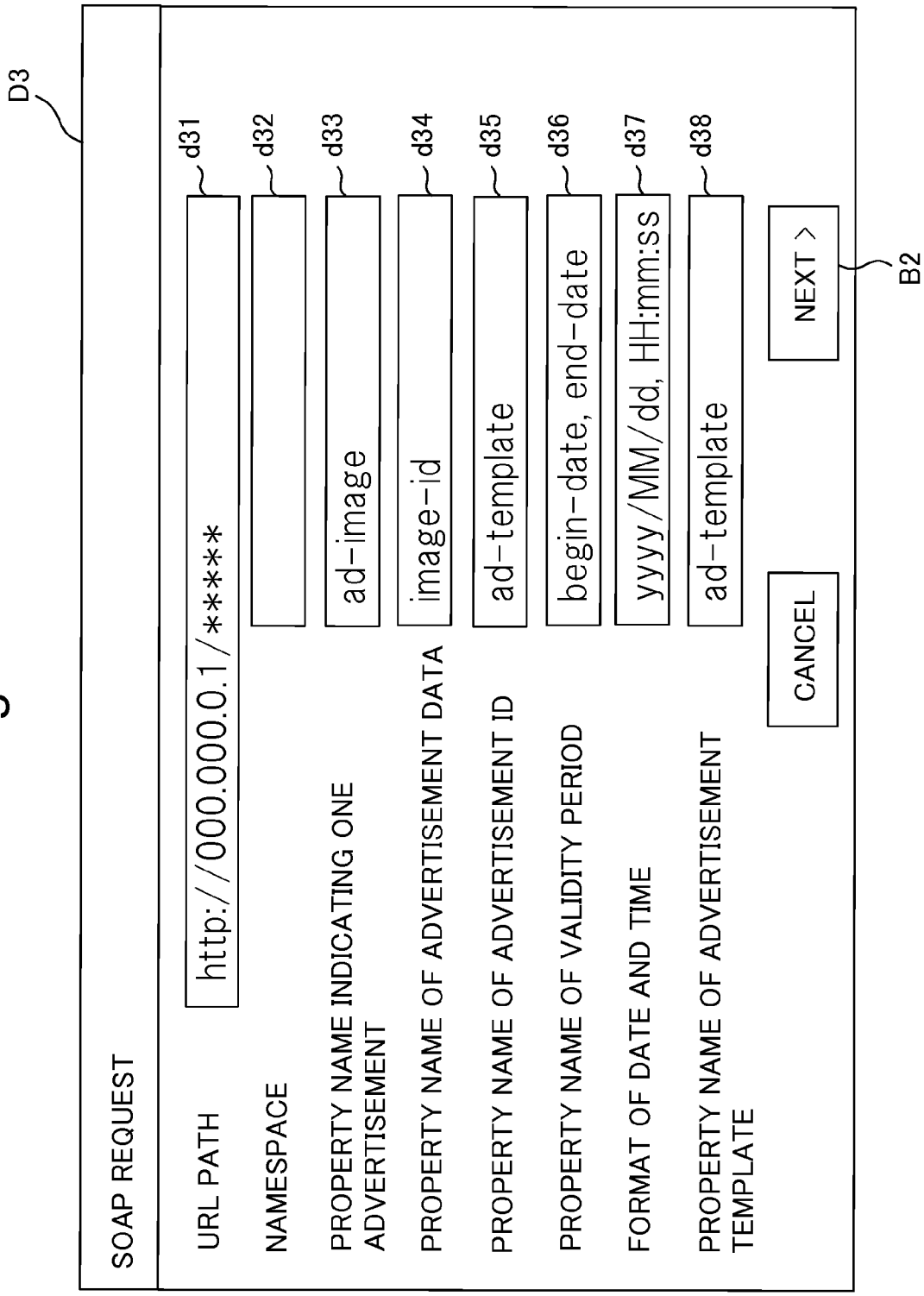
FIG. 7 shows an example of still another screen displayed on the display.

Next, a description will be given of processing for creating an application performed by the information processing apparatus 1 on which the application creating program is installed. FIG. 4 is a flowchart showing processing for creating a communication application by the information processing apparatus 1. FIGS. 5 to 7 are examples of screens displayed on the display 14.

When an operator operates the operating section 13 of the information processing apparatus 1 to enter an instruction to create a communication application, the display control section 101 allows the display 14 to display a first screen D1 of acquisition method acceptance shown as an example in FIG. 5 (S1).

The first screen D1 of acquisition method acceptance shows an acquisition method entry field d1 indicating data receipt via an HTTP or HTTPS POST request from the advertisement delivery server 3 (the above (A) (1)), an acquisition method entry field d12 indicating data receipt via a SOAP request from the advertisement delivery server 3 (the above (A) (2)), an acquisition method entry field d13 indicating readout from a USB memory (the above (A) (3)), and an acquisition method entry field d14 indicating data acquisition from the advertisement delivery server 3 by access from the image forming apparatus 2 to the advertisement delivery server 3 (the above (B)).

When during display of the first screen D1 of acquisition method acceptance the operator operates the mouse pointer serving as the operating section 13 to point to, among radio buttons for the acquisition method entry fields d11 to d14, a radio button for an entry field indicating a desired data acquisition method using a cursor and enter an instruction to specify the data acquisition method by left click or the like, the data acquisition method indicated by the specified entry field is accepted by the acquisition method acceptance section 102 (S2).

When after the entry of the data acquisition method the operator specifies a "NEXT" button B1 with the mouse pointer, the display control section 101 allows the display 14 to display, specifically for the data acquisition method accepted in S2, a screen for accepting setting items on the accepted data acquisition method (S3). Exceptionally, as for the data acquisition method of readout from a USB memory (the above (A) (3)), there is no further entry item and therefore no further screen is provided. In other words, in the case of the data acquisition method of readout from a USB memory ((A) (3)), processing necessary for specifying the data acquisition method ends with the acceptance in S2.

For example, when in S2 the data acquisition method (A) (1), data receipt via an HTTP or HTTPS POST request from the advertisement delivery server 3, is accepted, the display control section 101 allows the display 14 to display a second screen D2 of acquisition method acceptance shown as an example in FIG. 6. The second screen D2 of acquisition method acceptance shows the following setting items on the data acquisition method (A) (1): an entry field d21 indicating (11) the path of a URL; an entry field d22 indicating (12) the property name of an advertisement ID (such as image-id); an entry field d23 indicating (13) the property name of a validity period (such as begin-date and end-date); an entry field d24 indicating (14) the format of date and time (such as yyyy/MM/dd HH:mm:ss); and an entry field d25 indicating (15) the property name of an advertisement template (such as ad-template).

When during display of the second screen D2 of acquisition method acceptance the operator operates the mouse pointer serving as the operating section 13 to point the cursor to the individual entry fields d21 to d25 using the mouse pointer and enter desired characters or numerals through the keyboard, the values of the above setting items on the data acquisition method (A) (1) specified in S2 for the communication application to be created are accepted by the acquisition method acceptance section 102 (S4).

For another example, when in S2 the data acquisition method (A) (2), data receipt via a SOAP request from the advertisement delivery server 3, is accepted, the display control section 101 allows the display 14 to display a third screen D3 of acquisition method acceptance shown as an example in FIG. 7. The third screen D3 of acquisition method acceptance shows the following entry fields: an entry field d31 indicating (21) the path of a URL; an entry field d32 indicating (22) namespace; an entry field d33 indicating (23) the property name indicating one advertisement; an entry field d34 indicating (24) the property name of advertisement data; an entry field d35 indicating (25) the property parameter name of an advertisement ID; an entry field d36 indicating (26) the property parameter name of a validity period; an entry field d37 indicating (27) the format of date and time; and an entry field d38 indicating (28) the property name of an advertisement template.

When during display of the third screen D3 of acquisition method acceptance the operator operates the mouse pointer serving as the operating section 13 to point the cursor to the individual entry fields d31 to d38 using the mouse pointer and enter desired characters or numerals through the keyboard, the values of the above setting items on the data acquisition method (A) (2) specified in S2 for the communication application to be created are accepted by the acquisition method acceptance section 102 (S4).

Figure 8:
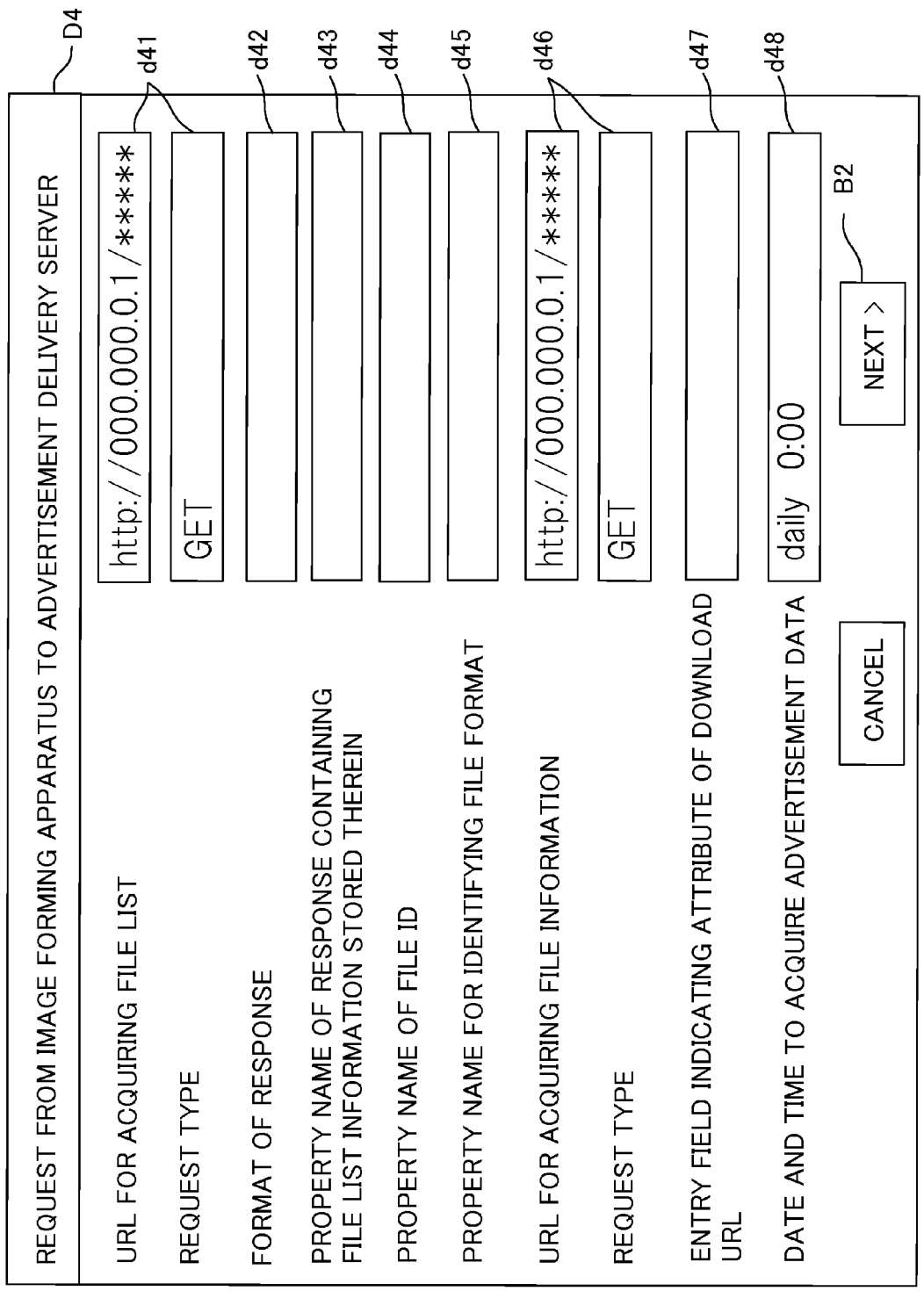
FIG. 8 shows an example of still another screen displayed on the display.

For still another example, when in S2 the data acquisition method (B), data acquisition from the advertisement delivery server 3 by access from the image forming apparatus 2 to the advertisement delivery server 3, is accepted, the display control section 101 allows the display 14 to display a fourth screen D4 of acquisition method acceptance shown as an example in FIG. 8. The fourth screen D4 of acquisition method acceptance shows the following entry fields: an entry field d41 indicating (31) a URL for acquiring a file list and a request type; an entry field d42 indicating (32) the format of a response; an entry field d43 indicating (33) the property name of a response containing file list information; an entry field d44 indicating (34) the property name of a file ID; an entry field d45 indicating (35) the property name for identifying a file format; an entry field d46 indicating (36) a URL for acquiring file information and a request type; an entry field d47 indicating (37) the attribute of a download URL; and an entry field d48 indicating (38) date and time to acquire advertisement data.

When during display of the fourth screen D4 of acquisition method acceptance the operator operates the mouse pointer serving as the operating section 13 to point the cursor to the individual entry fields d41 to d48 using the mouse pointer and enter desired characters or numerals through the keyboard, the values of the above setting items on the data acquisition method (B) specified in S2 for the communication application to be created are accepted by the acquisition method acceptance section 102 (S4).

When the operator completes the entry of the values of the setting items on any one of the second screen D2 of acquisition method acceptance, the third screen D3 of acquisition method acceptance, and the forth screen D4 of acquisition method acceptance and then operates the mouse pointer serving as the operating section 13 to specify a "NEXT" button B2, the acceptance of the entered data acquisition method and values of the setting items are confirmed by the acquisition method acceptance section 102.

Figure 9:
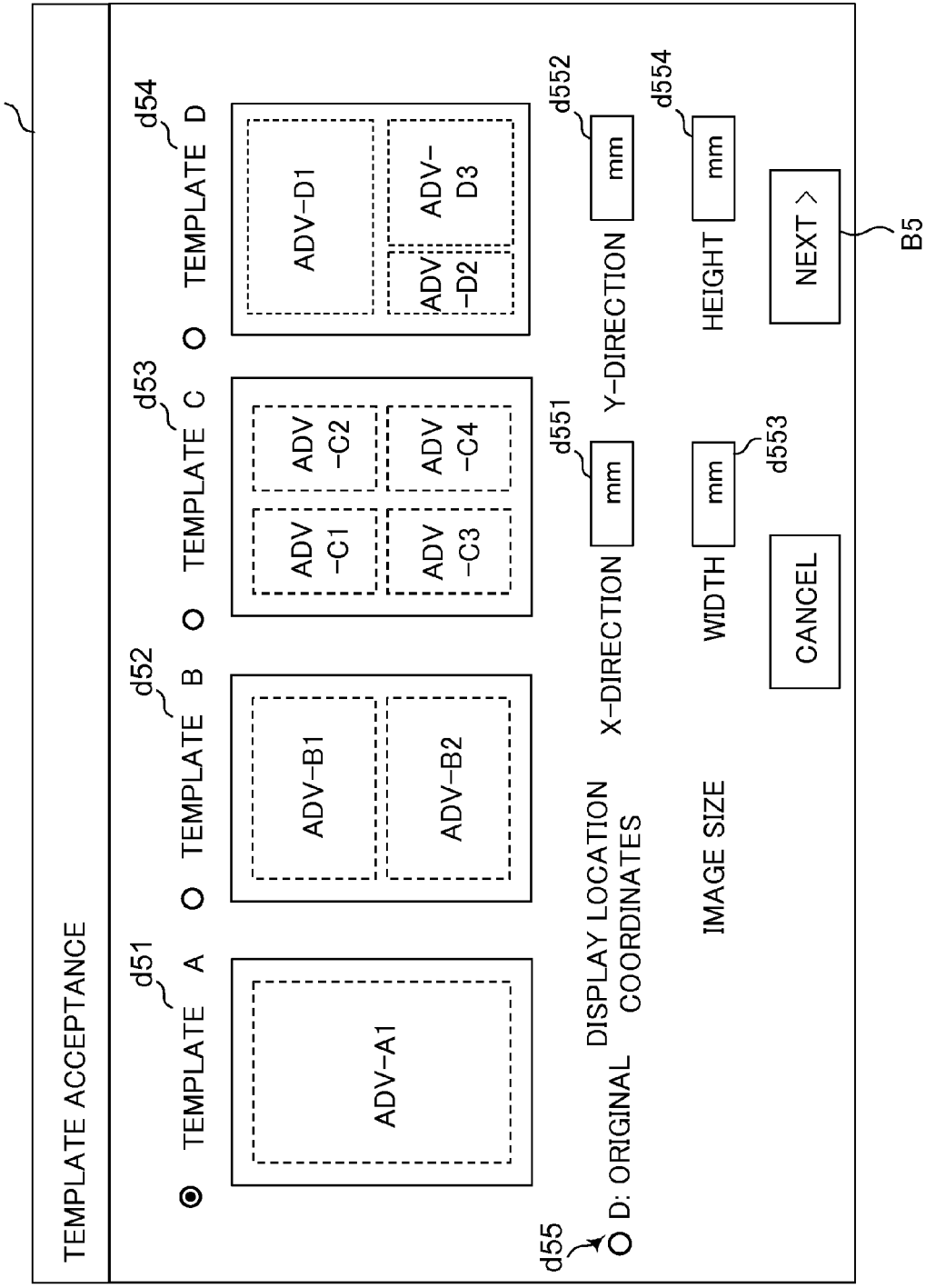
FIG. 9 shows an example of still another screen displayed on the display.

After the method for acquiring advertisement data is accepted in the above manner, the display control section 101 allows the display 14 to display a template acceptance screen D5 shown as an example in FIG. 9 (S5).

This template acceptance screen D5 is a screen on which a plurality of template candidates are displayed as layouts for use in generating an image or images for printing using advertisement data and through which a desired layout is accepted based on operator's operation of the operating section 13.

This template acceptance screen D5, as shown in FIG. 9, contains candidate images d51 to d54 indicating template candidates and an original template creating entry field d55. The candidate images d52 and d53 show templates in which a printable area on a recording paper sheet as a recording medium is equally divided into subareas and advertisement images indicated by a plurality of pieces of advertisement data are allocated to the respective associated subareas. The candidate image d54 shows a template in which a printable area on a recording paper sheet is divided into subareas having sizes set for individual pieces of advertisement data and advertisement images indicated by the plurality of pieces of advertisement data are allocated to the respective associated subareas.

When a template specifying a plurality of pieces of advertisement data is set by the above acceptance, a data management section 203 to be described hereinafter determines print data for use in generating images for printing in the layout based on the set template, according to the applicable order set to the pieces of advertisement data when acquired and stored on the HDD 92.

When during display of the template acceptance screen D5 the operator operates the mouse pointer to point the cursor to, among radio buttons for the candidate images d51 to d54, a radio button for a candidate image indicating a template formed of a desired layout and enter an instruction to specify the candidate image by left click or the like, the template corresponding to the specified candidate image is accepted as the template for use in generating images for printing by the template specification acceptance section 103.

Alternatively, when the operator points the cursor to an x-direction placement position entry field d551 in the original template creating entry field d55 with the mouse pointer, enters a desired numerical value specifying a placement start position in the x-direction in the printable area through the keyboard, then points the cursor to a y-direction placement position entry field d552 with the mouse pointer, and enters a desired numerical value specifying a placement start position in the y-direction in the printable area through the keyboard, the location of an advertisement image in the printable area is specified.

Furthermore, when the operator points the cursor to a placement area width entry field d553 with the mouse pointer, enters a desired numerical value specifying a distance in the x-direction (width) in the area for printing an advertisement image through the keyboard, and enters, into a placement area height entry field d554, a desired numerical value specifying a distance in the y-direction (height) in the area for printing an advertisement image through the keyboard, the dimensions of the area for printing an advertisement image is specified. Thus, the print image can be enlarged or reduced to a size having the specified dimensions.

When in this manner the operator enters desired values into the entry fields d551 to d554 in the original template creating entry field d55, a template formed of an original layout is accepted by the template specification acceptance section 103.

When the operator operates the mouse pointer serving as the operating section 13 to complete the specification of a template by the operations for the entry fields d51 to d55 on the template acceptance screen D5 and then specifies a "NEXT" button B5 with the mouse pointer, the acceptance of the template is confirmed by the template specification acceptance section 103 (S6).

Figure 10:
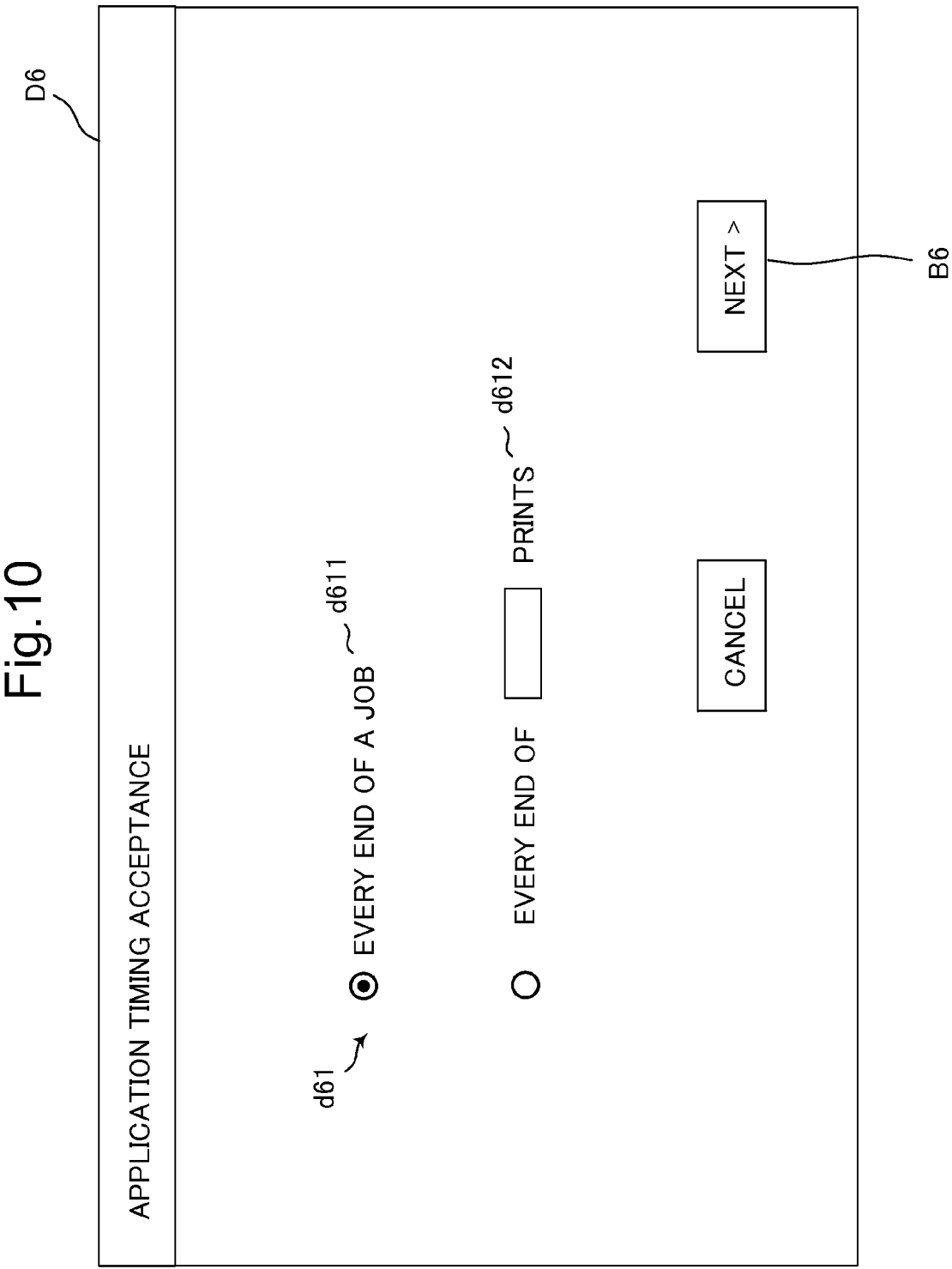
FIG. 10 shows an example of still another screen displayed on the display.

After the acceptance of the template, the display control section 101 allows the display 14 to display, for example, an applicable timing acceptance screen D6 shown as an example in FIG. 10 (S7).

This applicable timing acceptance screen D6 is a screen through which the timing specification acceptance section 104 accepts the specification of an applicable timing to replace advertisement data for use in generating an image or images for printing according to the template with another advertisement data and apply the new advertisement data. The applicable timing refers to the timing to replace an image or images for printing generated according to a template in the above manner with another or other images for printing and apply the other image or images for printing as that or those for printing by the image forming section 120.

This applicable timing acceptance screen D6, as shown in FIG. 10, contains an applicable timing entry field d61. When during display of the applicable timing acceptance screen D6 the operator operates the mouse pointer to point the cursor to a radio button for a unit-number-of-jobs switching entry field d611 in the applicable timing entry field d61 with the mouse pointer, it is specified that the applicable timing is at every end of a job. Alternatively, when the cursor is pointed to a unit-number-of-prints entry field d612 by the mouse pointer and a numerical value indicating a number of prints is entered into the entry field d612 through the keyboard, it is specified that the applicable timing is at every end of printing of the number of prints indicated by the entered numerical value.

When the operator operates the mouse pointer serving as the operating section 13 to complete the entry of an applicable timing on the applicable timing acceptance screen D6 and advertisement data and then specifies a "NEXT" button B6 with the mouse pointer, the acceptance of the entered switch timing and advertisement data is confirmed by the timing specification acceptance section 104 (S8).

Then, the application creating section 105 sets the accepted data acquisition method, template, and applicable timing to the programming tool stored in the tool storage section 106 to create the communication application (S9). In other words, the application creating section 105 uses the above programming tool to create a communication application capable of receiving advertisement data from the advertisement delivery server 3 by the accepted data acquisition method, generating an image or images for printing using the template accepted by the template specification acceptance section 103, and replacing advertisement data for use in generating an image or images for printing with the accepted applicable timing.

In this embodiment, for the setting of the data acquisition method when the image forming apparatus 2 receives advertisement data via a network from the advertisement delivery server 3, the processing of layout in printing the received advertisement data, and the management of the applicable timing, the operator can create a communication program having these functions based on the programming tool simply by entering the setting items in the manner described above. Thus, in developing a communication application, a developer is not required to have any technical know-how necessary for implementing a program for a communication module for communication with the advertisement delivery server 3, processing of layout based on a template, and data management of the applicable timing and so on. Therefore, technical and time burden on the developer can be reduced, so that a communication application capable of performing setting of the data acquisition method and data management can be more efficiently developed than before.

Generally, in the case where an image forming apparatus prints an advertisement image on a printed material, for example, on the back side thereof, based on print data received from a server on a network, a system achieving this purpose needs to be composed of at least an image forming apparatus and a delivery server. Therefore, in order to implement a print service for advertisement images, it is necessary that two types of applications for performing data communication and management for the print service are developed, one for each of the image forming apparatus and the delivery server. Because the application for processing in the delivery server is often developed by a third vendor or the like, it is difficult to develop an application that can be commonly used among a plurality of delivery servers. On the other hand, it can be considered, as for the image forming apparatus, that an application capable of being commonly used among image forming apparatuses of the same model can be developed. On this point, improvement is possible.

In this relation, it is possible to develop a communication application for performing the print service in the above image forming apparatus using the previously described SDK. However, such an SDK for use in developing a communication application generally has neither the function of setting the method for acquiring print data nor the function of managing the received print data. Therefore, the developer is required to have technical know-how to implement a program for setting of the data acquisition method and data management into the communication application, which is a burden in application development.

Unlike the above known technique, in this embodiment, a communication application capable of performing the function of setting the data acquisition method in acquiring print data from a print data providing device and the function of managing the acquired print data can be developed more efficiently than before.

Next, a description will be given of processing for data communication and data management based on the communication application created in the above manner. As described above, the communication application is created variously depending upon the data acquisition method, the template, and the applicable timing specified by the operator.

Figure 11:
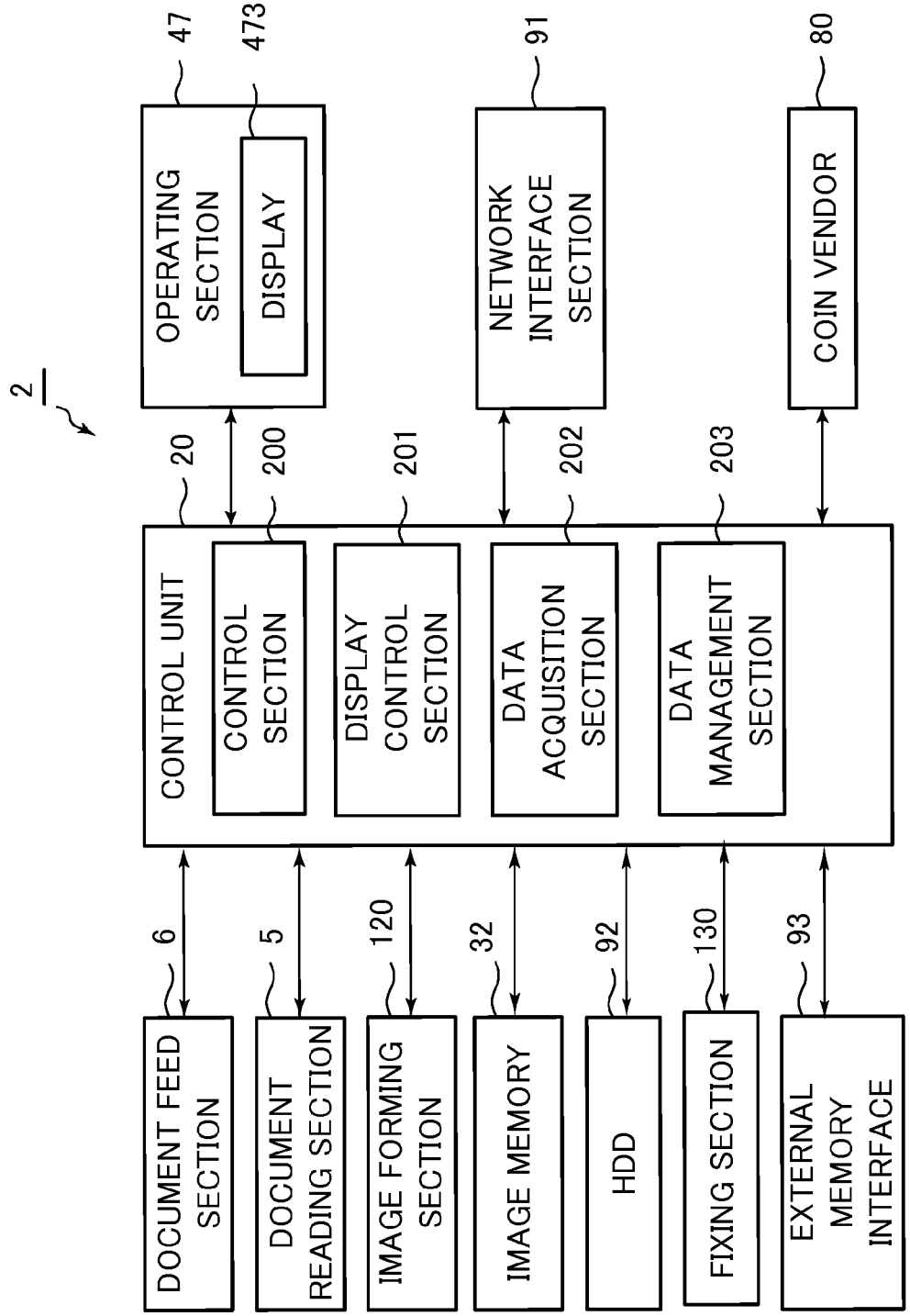
FIG. 11 is a block diagram showing an electrical configuration of the image forming apparatus.

First, a description will be given of the configuration of the image forming apparatus 2 on which the communication application is to be installed. FIG. 11 is a block diagram showing an electrical configuration of the image forming apparatus 2.

The created communication application is installed on the image forming apparatus 2. The image forming apparatus 2 includes a control unit 20, an operating section 47, a document feed section 6, a document reading section 5, an image memory 32, an image forming section 120, a fixing section 130, a network interface section 91, an HDD 92, and so on.

The document reading section (data acquisition section) 5 is under the control of the control unit 20 and includes a reader including a lighting part, a CCD sensor, and so on. The document reading section 5 is configured to read an image from an original document by irradiating the document with light from the lighting part and receiving the reflected light on the CCD sensor.

The image memory 32 provides an area for temporarily storing data of image of the original document read by the document reading section 5 and temporarily storing data to be printed by the image forming section 120.

The network interface section 91 is formed of a communication module, such as a LAN board, and configured to connect via the Internet connected thereto to a server providing a data storage service on the Web or a server providing an API on the Web and perform data communication with the server.

The HDD 92 is a large storage device capable of storing document images read by the document reading section 5 or like images. The communication application is installed on this HDD 92.

A coin vendor 80 is configured to accept users' insertion of notes or coins as a fee charged to users for data communication with the advertisement delivery server 3 on the image forming apparatus 2 to temporarily store or collect the money. The coin vendor 80 operates under the control of a control section 200.

The control unit 20 is composed of a CPU (central processing unit), a RAM, a ROM, a dedicated hardware circuit, and so on and governs the overall operation of the image forming apparatus 2. The control unit 20 includes the control section 200, a display control section 201, a data acquisition section 202, and a data management section 203.

The control section 200 is connected to the operating section 47, the document feed section 6, the document reading section 5, the image memory 32, the image forming section 120, the fixing section 130, the network interface section 91, the HDD 92, and so on and configured to control these sections.

The communication application is stored on the HDD 92 or in the ROM. The control unit 20 operates according to the communication application to function as the control section 200, the display control section 201, the data acquisition section 202, and the data management section 203. The control unit 20 may not operate according to the communication application, but alternatively may include as hardware circuits the control section 200, the display control section 201, the data acquisition 202, and the data management section 203.

The display control section 201 is configured to allow a display 473 to display various operating screens used for operations in performing communication and printing based on the communication application.

The data acquisition section 202 is configured to perform various controls necessary for communication based on the communication application to establish data communication with the advertisement delivery server 3 and acquire advertisement data from the advertisement delivery server 3 by the data acquisition method set for the communication application in the previously described manner.

The data management section 203 allows the HDD 92 to hold advertisement data acquired by the data acquisition section 202 and is configured to use the advertisement data to generate an image or images for printing according the template set in the previously described manner and output the generated image or images for printing as data for printing to the image forming section 120. The data management section 203 is further configured to change print data for use in generating an image or images for printing according to the template, with the previously described applicable timing set for the communication application.

Next, a description will be given of data communication and data management performed on the image forming apparatus 2 based on the communication application created in the above manner. FIG. 12 is a flowchart showing processing for data communication and data management performed by the image forming apparatus 2 based on the communication application.

When an operator operates the operating section 47 on the image forming apparatus 2 to enter an instruction to run the communication application, the control section 200 runs the communication application (S101).

Then, the data acquisition section 202 acquires advertisement data and various accompanying pieces of information from the advertisement delivery server 3 (S102). The number of pieces of advertisement data acquired by the image forming apparatus 2 is not limited to one and may be plural. The description in this embodiment will be given by taking, as an example, the case where the image forming apparatus 2 acquires a plurality of pieces of advertisement data.

For example, when the previously described data acquisition method (A) (1) or (A) (2) is set for the communication application, the data acquisition section 202 waits for advertisement data to be sent from the advertisement delivery server 3. When advertisement data is sent from the advertisement delivery server 3, the data acquisition section 202 receives the advertisement data through the network interface section 91.

On the other hand, when the previously described data acquisition method (A) (3) is set for the communication application, the data acquisition section 202 waits for a USB memory containing advertisement data stored therein to be connected to the external memory interface 93. When the USB memory is connected to the external memory interface 93, the data acquisition 202 reads advertisement data through the external memory interface 93 from the USB memory.

Alternatively, when the previously described data acquisition method (B) is set for the communication application, the data acquisition 202 measures the advent of the time to receive data set to the communication application with a timer or the like contained in the control unit 20. When determining that the time to receive data has come, the data acquisition section 202 connects through the network interface section 91 to the advertisement delivery server 3 and acquires advertisement data from the advertisement delivery server 3.

The advertisement delivery server 3 sends, in addition to the advertisement data, various pieces of accompanying information, including an advertisement ID and a validity period which are formed of a property name or a format. In acquiring the advertisement data, the data acquisition section 202 receives the advertisement data and these pieces of accompanying information. On the other hand, the USB memory holds these pieces of accompanying information. When communicating with the USB memory to read advertisement data from the USB memory, the data acquisition section 202 reads the pieces of accompanying information together with the advertisement data.

The data acquisition section 202 stores the acquired or read advertisement data and pieces of accompanying information on the HDD 92 (S103).

When a plurality of pieces of advertisement data are sequentially acquired by the image forming apparatus 2, the data management section 203 uses, upon acquisition of every piece of advertisement data, the piece of advertisement data to generate an image for printing and allows the HDD 92 to store the generated image. When the plurality of pieces of advertisement data have been stored on the HDD 92 in the above manner, the data management section 203 sets, for example, the order of storage of the pieces of advertisement data on the HDD 92 as the applicable order to printing of them.

After acquisition of the pieces of advertisement data and pieces of accompanying information, the data management section 203 analyses the validity period contained in the received pieces of accompanying information on each piece of advertisement data and determines whether the present time has reached the start time of the validity period and is within the validity period (S104). If the data management section 203 determines that the present time is within the validity period for the piece of advertisement data (YES in S104), it generates an image for printing using the piece of advertisement data determined to be within the validity period according to the template set for the communication application and allows the HDD 92 to store the generated image (S105).

For example, if the template is a template according to which an image for printing is generated using a single piece of advertisement data, the data management section 203 sequentially uses the stored pieces of advertisement data in the previously described applicable order with the applicable timings to be described hereinafter to generate images for printing. On the other hand, if the template is a template according to which a set of images for printing are generated using a given number of pieces of advertisement data, the data management section 203 uses, from among stored pieces of advertisement data, the given number of pieces of advertisement data sequentially in the previously described applicable order with the applicable timings to be described hereinafter to generate images for printing.

The data management section 203 applies the generated image or images for printing as print data to be printed by the image forming section 120 to a printed matter, for example, to the back side of the printed matter on the front side of which another image is printed or copied on the image forming apparatus 2 (the side of the printed matter opposite to the principal image forming side thereof).

After the generation of images for printing, the data management section 203 determines, for the stored images for printing (images for printing generated using pieces of advertisement data received from the advertisement delivery server 3), whether the applicable timing set for the communication application, i.e., the timing to replace a piece or pieces of advertisement data for use in generating an image or images for printing according to the template with another or other pieces of advertisement data, has come (S106). For example, if the applicable timing is set at every end of a print job, the data management section 203 determines whether or not a job has completed. If the applicable timing is set at every end of printing of a set number of prints, the data management section 203 determines whether or not the printing of the set number of prints has been completed.

If the data management section 203 determines that the applicable timing has come (YES in S106), it replaces a piece or pieces of advertisement data having been used in generating an image or images for printing according to the template with another or other pieces of advertisement data being within a validity period (S107).

Next, the data management section 203 determines, with reference to the present time, whether the stored pieces of advertisement data contain one or more pieces of advertisement data beyond the validity period (S108). If the data management section 203 determines that there are one or more pieces of advertisement data beyond the validity period (YES in S108), it deletes the piece or pieces of advertisement data beyond the validity period from the HDD 92 (S109). After the deletion or if in S108 the data management section determines that there is no piece of advertisement data beyond the validity period (NO in S108), the processing ends. In the image forming apparatus 2, the processing steps from S102 to S109 are repeated until the exit of the communication application.

The present disclosure is not limited to the configuration of the above embodiment and can be modified in various ways. For example, although the description in the above embodiment has been given by taking an image forming apparatus as one embodiment of the present disclosure, the image forming apparatus is merely illustrative and any other type of electronic apparatus, such as a printer, a copier or a facsimile machine, may be used.

The structure and processing shown in the above embodiment with reference to FIGS. 1 to 12 are merely illustrative of the present disclosure and not intended to limit the present disclosure to the above particular structure and processing. For example, the application creating program capable of creating a communication application may be contained in the advertisement delivery server 3 and the communication application may be able to be created by the advertisement delivery server 3.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. An information processing apparatus configured to create a communication application capable of allowing a client terminal to acquire print data from a print data providing device and allowing the client terminal to manage the acquired print data, the information processing apparatus comprising:
    a tool storage section storing a predetermined programming tool having a function of communication with the print data providing device and a function of management of the print data acquired from the print data providing device;
    an acquisition method acceptance section configured to accept, from either one of (1) an HTTP or HTTPS POST request and (2) a SOAP request, setting of a data acquisition method for acquiring the print data from the print data providing device, and to accept values of setting items associated with the data acquisition method having been accepted;
    a display;
    a display control section configured to display on the display an image indicating an entry field for the setting items associated with the data acquisition method having been accepted at the acquisition method acceptance section;
    a template specification acceptance section holding a plurality of templates indicating different layouts for the print data and configured to accept specification of a template for use in printing the print data from among the plurality of templates; and
    an application creating section configured to use the programming tool stored in the tool storage section to create the communication application allowing acquisition of the print data from the print data providing device according to the accepted data acquisition method and generation of an image using the print data according to the template accepted by the template specification acceptance section.

2. The information processing apparatus according to claim 1, further comprising a timing specification acceptance section configured to accept specification of an applicable timing to replace the print data for use in the printing with an alternative print data and apply the alternative print data,
    wherein the application creating section is further configured to use the programming tool to create the communication application capable of replacing the print data with the alternative print data with the applicable timing accepted by the timing specification acceptance section.

3. The information processing apparatus according to claim 1, wherein the template specification acceptance section holds the template in which a printable area on a recording medium is divided into equal subareas and respective print images of a plurality of pieces of the print data are allocated to respective associated subareas divided from the printable area.

4. The information processing apparatus according to claim 1, wherein the template specification acceptance section holds the template in which a printable area on a recording medium is divided into subareas having sizes set for a plurality of individual pieces of the print data and respective print images of the plurality of individual pieces of the print data are allocated to respective associated subareas divided from the printable area.

5. The information processing apparatus according to claim 2, wherein the template specification acceptance section holds the template according to which a set of print images are generated using a plurality of pieces of the print data, and when the template specification acceptance section accepts the template according to which the set of print images are generated using the plurality of pieces of the print data, the application creating section uses the programming tool to create the communication application capable of replacing the plurality of pieces of the print data with other pieces of print data with the applicable timing accepted by the timing specification acceptance section.

6. A computer-readable non-transitory recording medium with an application creating program capable of creating a communication application stored thereon, the application creating program being configured to create the communication application capable of allowing a client terminal to acquire print data from a print data providing device and allowing the client terminal to manage the acquired print data, the application creating program being further configured to allow a computer to operate as:

a tool storage section storing a predetermined programming tool having a function of communication with the print data providing device and a function of management of the print data acquired from the print data providing device;

an acquisition method acceptance section configured to accept, from either one of (1) an HTTP or HTTPS POST request and (2) a SOAP request, setting of a data acquisition method for acquiring the print data from the print data providing device, and to accept values of setting items associated with the data acquisition method having been accepted;

a display control section configured to display on a display an image indicating an entry field for the setting items associated with the data acquisition method having been accepted at the acquisition method acceptance section;

a template specification acceptance section holding a plurality of templates indicating different layouts for the print data and configured to accept specification of a template for use in printing the print data from among the plurality of templates; and an application creating section configured to use the programming tool stored in the tool storage section to create the communication application allowing acquisition of the print data from the print data providing device according to the accepted data acquisition method and generation of an image using the print data according to the template accepted by the template specification acceptance section.

* * * * *